(12) United States Patent
Slayne

(10) Patent No.: US 10,087,995 B2
(45) Date of Patent: Oct. 2, 2018

(54) TOLERANCE RING

(71) Applicant: SAINT-GOBAIN PERFORMANCE PLASTICS RENCOL LIMITED, Coventry (GB)

(72) Inventor: Andrew Robert Slayne, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 355 days.

(21) Appl. No.: 14/732,106

(22) Filed: Jun. 5, 2015

(65) Prior Publication Data
US 2015/0354637 A1 Dec. 10, 2015

Related U.S. Application Data

(60) Provisional application No. 62/008,996, filed on Jun. 6, 2014.

(51) Int. Cl.
| | | |
|---|---|---|
| *F16D 9/08* | (2006.01) | |
| *F16C 35/07* | (2006.01) | |
| *F16D 1/08* | (2006.01) | |
| *F16D 7/02* | (2006.01) | |

(52) U.S. Cl.
CPC ............... *F16D 9/08* (2013.01); *F16C 35/07* (2013.01); *F16D 1/0835* (2013.01); *F16D 7/021* (2013.01); *Y10T 403/7051* (2015.01)

(58) Field of Classification Search
CPC ......... Y10T 403/7047; Y10T 403/7061; F16D 1/08; F16D 1/0835; F16D 1/06
See application file for complete search history.

(56) References Cited

U.S. PATENT DOCUMENTS

| | | | |
|---|---|---|---|
| 2,101,244 A | | 12/1937 | Curtis |
| 2,657,082 A | * | 10/1953 | Blackman ............. F16D 1/0835 403/357 |
| 2,886,354 A | | 5/1959 | Björklund |
| 3,097,871 A | | 7/1963 | McNally |
| 3,319,484 A | | 5/1967 | Prest |
| 3,348,887 A | | 10/1967 | Sheps |
| 4,186,824 A | | 2/1980 | Preston et al. |
| 4,250,927 A | * | 2/1981 | Newburg ................. F16L 7/00 138/113 |

(Continued)

FOREIGN PATENT DOCUMENTS

| | | |
|---|---|---|
| CA | 1111354 A1 | 10/1981 |
| CA | 1320978 C | 8/1993 |

(Continued)

OTHER PUBLICATIONS

Rigid Coupling: hexagonal shaft collar, Stafford, directindustry.com/.../rigid-couplings-hexagonal-shaft-collars-14788-355068 ..., 2 pages.

(Continued)

*Primary Examiner* — Michael P Ferguson
(74) *Attorney, Agent, or Firm* — Abel Law Group, LLP; Chi Suk Kim

(57) ABSTRACT

A tolerance ring comprising a body including a plurality of sidewall segments, each sidewall segment having a thickness and a height, wherein the body has an aspect ratio, as measured by a ratio of the height of the sidewall segment to the thickness of the sidewall segment, of no less than 2:1.

20 Claims, 7 Drawing Sheets

(56) References Cited

U.S. PATENT DOCUMENTS

| | | | |
|---|---|---|---|
| 4,657,052 A | 4/1987 | Baumann | |
| 4,752,163 A | 6/1988 | Fedor | |
| 4,848,935 A | 7/1989 | Seibig et al. | |
| 5,040,905 A | 8/1991 | Boyd | |
| 5,049,158 A | 9/1991 | Engelhardt et al. | |
| 5,278,352 A | 1/1994 | Schade | |
| 5,473,140 A | 12/1995 | Colling | |
| 5,511,887 A | 4/1996 | Waskiewicz | |
| 5,655,865 A | 8/1997 | Plank et al. | |
| 5,782,930 A | 7/1998 | Lin et al. | |
| 5,803,193 A | 9/1998 | Krueger et al. | |
| 6,517,115 B1 | 2/2003 | Blivet | |
| 6,527,449 B1 | 3/2003 | Koyama et al. | |
| 6,655,847 B2 | 12/2003 | Obara et al. | |
| 6,693,733 B2 | 2/2004 | Kurosawa | |
| 6,883,836 B2 | 4/2005 | Breay et al. | |
| 7,137,795 B2 | 11/2006 | Kamal et al. | |
| 7,334,784 B2 | 2/2008 | Kobelev et al. | |
| 7,370,553 B2 | 5/2008 | Kittler et al. | |
| 7,741,747 B2 | 6/2010 | Yamamura et al. | |
| 7,766,550 B2 | 8/2010 | Larue | |
| 7,768,168 B2 | 8/2010 | Aschoff et al. | |
| 7,837,375 B2 | 11/2010 | Watanabe et al. | |
| 7,978,437 B2 | 7/2011 | Hanrahan et al. | |
| 2003/0111801 A1 | 6/2003 | Stephens | |
| 2006/0276246 A1 | 12/2006 | Needes et al. | |
| 2009/0001245 A1 | 1/2009 | Katougi et al. | |
| 2009/0218180 A1 | 9/2009 | Roberts et al. | |
| 2009/0219343 A1 | 9/2009 | Kijima et al. | |
| 2011/0076096 A1 | 3/2011 | Slayne et al. | |
| 2012/0087044 A1* | 4/2012 | Schmidt | G11B 5/4813 360/265.6 |
| 2013/0163912 A1 | 6/2013 | Aparimarn et al. | |

FOREIGN PATENT DOCUMENTS

| | | |
|---|---|---|
| EP | 0183333 A2 | 6/1986 |
| EP | 0291439 B1 | 11/1988 |
| EP | 0687822 B2 | 9/2004 |
| EP | 1568554 A1 | 8/2005 |
| EP | 1731783 A2 | 12/2006 |
| EP | 1693279 B1 | 8/2008 |
| EP | 1441142 B1 | 12/2008 |
| EP | 2012025 A1 | 1/2009 |
| EP | 2305983 A1 | 4/2011 |
| FR | 2869081 A1 | 10/2005 |
| GB | 191213916 A | 6/1913 |
| GB | 608607 A | 9/1948 |
| GB | 652348 A | 4/1951 |
| GB | 726836 A | 3/1955 |
| GB | 727099 A | 3/1955 |
| GB | 773859 A | 5/1957 |
| GB | 783265 A | 9/1957 |
| GB | 891280 A | 3/1962 |
| GB | 932762 A | 7/1963 |
| GB | 1092092 A | 11/1967 |
| GB | 1183881 A | 3/1970 |
| GB | 1245584 A | 9/1971 |
| GB | 1247494 A | 9/1971 |
| GB | 1314894 A | 4/1973 |
| GB | 1362725 A | 8/1974 |
| GB | 2351524 A | 1/2001 |
| JP | 2010273482 A | 12/2010 |
| KR | 20030027285 A | 4/2003 |
| WO | 2005106269 A1 | 11/2005 |
| WO | 2011036126 A1 | 3/2011 |
| WO | 2013164608 A1 | 11/2013 |
| WO | 2015185735 A1 | 12/2015 |

OTHER PUBLICATIONS

International Search Report for PCT/EP2015/062599 dated Aug. 13, 2015, 2 pages.

* cited by examiner

TOLERANCE RING

CROSS-REFERENCE TO RELATED APPLICATION(S)

The present application claims priority from U.S. Provisional Patent Application No. 62/008,996, filed Jun. 6, 2014, entitled "TOLERANCE RING," naming inventor Andrew Robert Slayne, and said provisional application is incorporated by reference herein in its entirety for all purposes.

FIELD OF THE DISCLOSURE

The present disclosure relates to tolerance rings, and more particularly to polygonal tolerance rings.

RELATED ART

A tolerance ring may be disposed in a radial gap formed between an inner component, e.g., a shaft, and an outer component, e.g., a bore formed in a housing. The tolerance ring can act as a force limiter to permit torque to be transmitted between the inner and outer components. The use of a tolerance ring can accommodate variations in the diameter of the inner and outer components while maintaining interconnection therebetween.

Typically, a tolerance ring comprises a band of resilient material, e.g. a metal such as spring steel, the ends of which are brought towards one another to form an annular ring. Although tolerance rings usually comprise a strip of resilient material that is curved to allow the easy formation of a ring, a tolerance ring may also be manufactured as an annular band.

Projections are typically stamped into the band of resilient material. The projections can span the radial gap between the inner and outer component and transmit forces therebetween. Because the band of resilient material is often formed from a thin strip of material to accommodate necessary slip conditions, the stamped projections typically extend less than 1.5 mm. Thus, traditional tolerance rings are not well suited for applications with large radial gaps, e.g., radial gaps greater than 2 mm, such as greater than 3 mm, greater than 4 mm, or even greater than 5 mm.

There continues to exist a need for tolerance rings adapted to be used in applications having a large radial gap between the inner and outer components.

BRIEF DESCRIPTION OF THE DRAWINGS

Embodiments are illustrated by way of example and are not limited in the accompanying figures.

Figure 1:
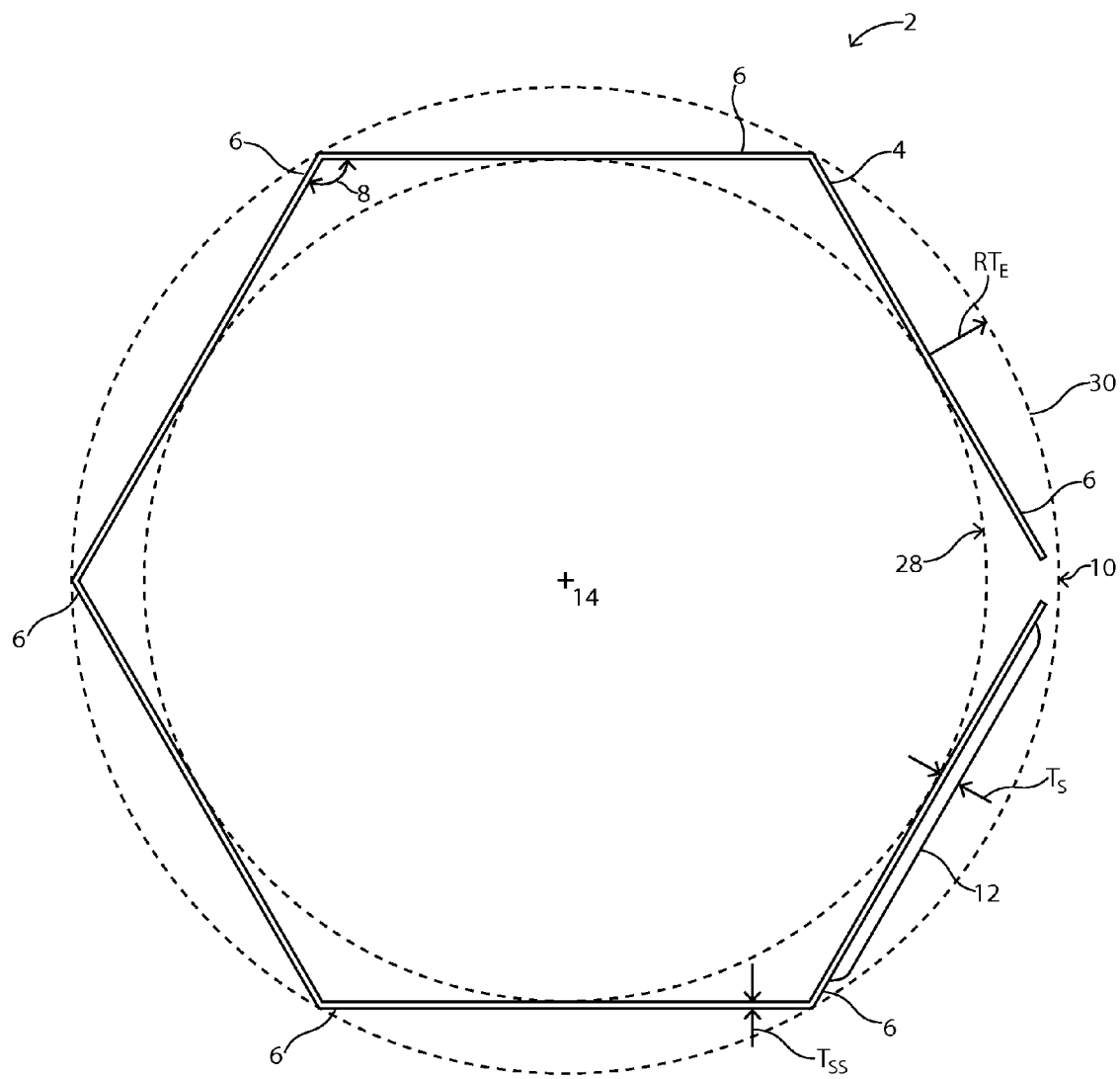
FIG. 1 includes a top view of a tolerance ring in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application. Reference to ranges The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring arts.

A tolerance ring in accordance with one or more of the embodiments described herein can generally include a body having a plurality of sidewall segments. Each sidewall segment can define a thickness and a height. In certain embodiments, an aspect ratio, as measured by a ratio of the height of the sidewall segment to the thickness of the sidewall segment, can be no less than 2:1.

An assembly in accordance with one or more of the embodiments described herein can generally include an outer component defining a bore, an inner component disposed within the bore of the outer component, and a tolerance ring disposed between the inner component and the outer component. The tolerance ring can include a plurality of sidewall segments each contacting the inner component along a portion thereof.

Referring now to FIG. 1, a tolerance ring 2 in accordance with one or more of the embodiments described herein can generally include a body 4 having a plurality of sidewall segments 6. In a particular embodiment, at least one of the sidewall segments 6 can be planar in the unassembled state, i.e., prior to installation of the tolerance ring 2 between inner and outer components, such that a majority of the sidewall segment 6 lies along a plane. In a more particular embodiment, all of the sidewall segments 6 can be planar in the unassembled state. In this regard, at least 65% of each sidewall segment 6 can lie along a plane, such as at least 70% of each sidewall segment, at least 75% of each sidewall segment, at least 80% of each sidewall segment, at least 85% of each sidewall segment, at least 90% of each sidewall segment, or even at least 95% of each sidewall segment can lie along a plane.

In a certain embodiment, the tolerance ring 2 can include at least 3 sidewall segments, such as at least 4 sidewall segments, at least 5 sidewall segments, at least 6 sidewall segments, at least 7 sidewall segments, at least 8 sidewall segments, at least 9 sidewall segments, at least 10 sidewall segments, at least 15 sidewall segments, or even at least 20 sidewall segments. In a further embodiment, the tolerance ring can include no greater than 75 sidewall segments, such as no greater than 50 sidewall segments, or even no greater than 25 sidewall segments. In this regard, when viewed from a top view, such as illustrated in FIG. 1, the tolerance ring 2 can define a polygon, such as, for example, a triangle, a quadrilateral, a pentagon, a hexagon, a heptagon, an octagon, a nonagon, a decagon, etc.

After reading this specification, a person of ordinary skill in the art will understand that the number of sidewall segments 6 defining the body 4 of the tolerance ring 2 may depend on a thickness of a radial gap formed between an inner component and an outer component of an assembly. For example, as explained in greater detail below, assemblies having a large radial gap may utilize less sidewall segments 6 as compared to assemblies having a small radial gap, where more sidewall segments 6 may be required.

By way of a non-limiting example, the tolerance ring 2 can be shaped in a jig. In this regard, a strip of resilient material can be bent on the jig at desired locations to form bent portions. The strip of resilient material can comprise a metal, such as, for example, spring steel. In a non-limiting embodiment, the strip of resilient material can additionally, or alternatively, include a polymer, or a polymer coating. In particular embodiments, the polymer coating can at least partially include a friction altering material, such as, for example, a low friction material or a high friction material. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a particular embodiment, the tolerance ring 2 can further define a circumferential gap 10 disposed between circumferential ends of the tolerance ring 2. The gap 10 can extend the entire axial length of the tolerance ring 2 so as to form a split tolerance ring. In certain applications, the gap 10 can be welded together at one or more locations along the circumferential ends of the tolerance ring 2. The weld(s) can be permanent or temporary. A temporary weld may be utilized during transportation of the tolerance rings 2 in order to prevent entanglement of the tolerance rings. Alternatively, the weld can be permanent so as to form a closed tolerance ring.

Sidewall segments 6 not located adjacent to the gap 10 can meet at angles, A (illustrated in FIG. 1 at 8). In a particular embodiment, each angle 8 can be no less than 60°, such as no less than 90°, no less than 120°, or even no less than 150°. In a further embodiment, each angle 8 can be less than 180°, such as no greater than 170°, no greater than 160°, no greater than 150°, no greater than 140°, no greater than 130°, no greater than 120°, or even no greater than 110°. In a particular embodiment, the angles 8 can all lie along straight lines that extend in a substantially parallel direction. As used herein, "substantially parallel direction" refers to a deviation of no greater than 5° between the measured directions of two lines, such as no greater than 4°, no greater than 3°, or even no greater than 2°. In a more particular embodiment, the angles 8 can all lie along lines that extend in parallel. As used herein, "extend in parallel" refers to a deviation of no greater than 0.5° between the measured directions of two lines. In this regard, the sidewall segments 6 can each have parallel circumferential end lines.

In a particular embodiment, when viewed from a top view, the tolerance ring 2 can comprise a regular polygon, that is, the tolerance ring 2 can be a polygon that is both equiangular and equilateral. Regular polygons generally have n-fold rotational symmetry, having a number of rotationally symmetric orientations equal to the number of sidewalls thereof. For example, regular triangles have three points of rotational symmetry, regular quadrilaterals have four points of rotational symmetry, regular pentagons have five points of rotational symmetry, and so on. In a particular embodiment, a regular polygon may evenly displace loading conditions around the tolerance ring 2 so as to avoid uneven radial loading conditions and any undesirable eccentric operational effects.

In a particular embodiment, each sidewall segment 6 can be adapted to deflect upon a loading condition, e.g., application of a radially outward force supplied by an inner component. In this regard, each sidewall segment 6 can be adapted to act as a beam. As used herein, the term "beam" refers to the load deflection characteristic exhibited by a beam under normal loading conditions. Whereas traditional tolerance rings may permit the absorption of a tolerance between mating components through elastic or plastic deformation of projecting waves extending from an annular body, the sidewall segments, as described herein, can bend to absorb the tolerance between mating components. In such a manner, the sidewall segments can bend or deflect like a beam under a loading condition. In particular embodiments, at least one stiffener can be used to generate a specific bending characteristic of at least one sidewall segment 6. As used herein, a "stiffener" refers to a feature adapted to alter the stiffness profile of the tolerance ring 2, e.g., by altering the stiffness profile of at least one of the sidewall segments 6. This may adjust the stiffness of each sidewall segment 6 and may allow for use of the tolerance ring 2 in various different applications.

In a certain embodiment, at least one stiffener 12 can extend radially from at least one sidewall segment 6. In another embodiment, at least one stiffener 12 can extend from each sidewall segment 6. In yet a further embodiment, a plurality of stiffeners 12 can extend from each sidewall segment 6.

It is not necessary that each sidewall segment 6 have the same number of stiffeners 12, the same shape stiffeners 12, or even that all the sidewall segments 6 have a stiffener 12. However, in a particular embodiment, each sidewall segment 6 can have a same number of stiffeners 12. In yet a further embodiment, each sidewall segment 6 can have one or more same shape stiffener(s) 12 oriented in a same direction relative to the sidewall segment 6.

In a particular embodiment, the stiffeners 12 can each include a projection extending from the sidewall segment 6. In a more particular embodiment, the stiffeners 12 can be monolithic with the sidewall segment 6, e.g., pressed, punched, or otherwise deformed from a continuous portion of the sidewall segment 6. As used herein, monolithic sidewall stiffeners are not readily detachable from the sidewall segment and may not have a discrete connection point therewith. In another embodiment, at least one of the stiffeners 12 can be a separate component attached to one or more of the sidewall segments 6 by a fastening technique, such as, for example, a fastening element, e.g., a threaded or non-threaded fastener; an adhesive; by mechanical deformation, e.g., crimping or bending; by weld; or by any combination thereof.

In a particular embodiment, each stiffener 12 can extend radially inward toward a central axis 14 of the tolerance ring 2. In another embodiment, each stiffener 12 can extend radially outward away from the central axis 14 of the tolerance ring 2. In yet another embodiment, at least one stiffener 12 can extend radially inward towards the central axis 14 of the tolerance ring 2 and at least one stiffener 12 can extend radially outward away from the central axis 14 of the tolerance ring 2.

In the unassembled state, each sidewall segment 6 can define an undeformed thickness, $T_{SS}$, as measured by a distance between a radially inner surface of the sidewall segment 6 and a radially outer surface of the sidewall segment 6 at an undeformed location, e.g., a location of the sidewall segment 6 devoid of a stiffener 12. In a particular embodiment, the undeformed thickness, $T_{SS}$, of each sidewall segment 6 can be less than a thickness, $T_S$, of the sidewall segment 6 as measured at the stiffener 12, as measured by a distance between a plane formed by the radially inner surface of the sidewall segment 6 and a radially outermost apex of each stiffener 12, e.g., the maximum distance the stiffener 12 extends from the radially inner surface of the sidewall segment as measured in a direction perpendicular to the inner surface of the sidewall segment. In a particular embodiment, $T_S$ can be no less than 1.01 $T_{SS}$, such as no less than 1.05 $T_{SS}$, no less than 1.1 $T_{SS}$, no less than 1.15 $T_{SS}$, no less than 1.2 $T_{SS}$, no less than 1.25 $T_{SS}$, no less than 1.3 $T_{SS}$, no less than 1.35 $T_{SS}$, no less than 1.4 $T_{SS}$, or even no less than 1.45 $T_{SS}$. In another embodiment, $T_S$ can be no greater than 2.0 $T_{SS}$, such as no greater than 1.95 $T_{SS}$, no greater than 1.9 $T_{SS}$, no greater than 1.85 $T_{SS}$, no greater than 1.8 $T_{SS}$, no greater than 1.75 $T_{SS}$, no greater than 1.7 $T_{SS}$, no greater than 1.65 $T_{SS}$, no greater than 1.6 $T_{SS}$, no greater than 1.55 $T_{SS}$, or even no greater than 1.5 $T_{SS}$. A person of ordinary skill will understand after reading this specification that in particular embodiments, the ratio of $T_S$ to $T_{SS}$ can vary as measured between different stiffeners 12 or between different sidewall segments 6.

In the unassembled state, the tolerance ring 2 can further define an effective radial thickness, $RT_E$, as measured by a shortest distance between an innermost radial location 28 and an outermost radial location 30 thereof. In a non-limiting embodiment, such as illustrated in FIG. 1, $RT_E$ can be expressed as a smallest circle 28 that contacts each sidewall segment 6 at a single location. A second concentric circle 30 can contact each sidewall segment 6 at opposite axial ends thereof. In third regard, $RT_E$ can be defined as a distance between the smallest circle 28 and the second concentric circle 30 in a direction normal to the location of measurement.

Figure 2:
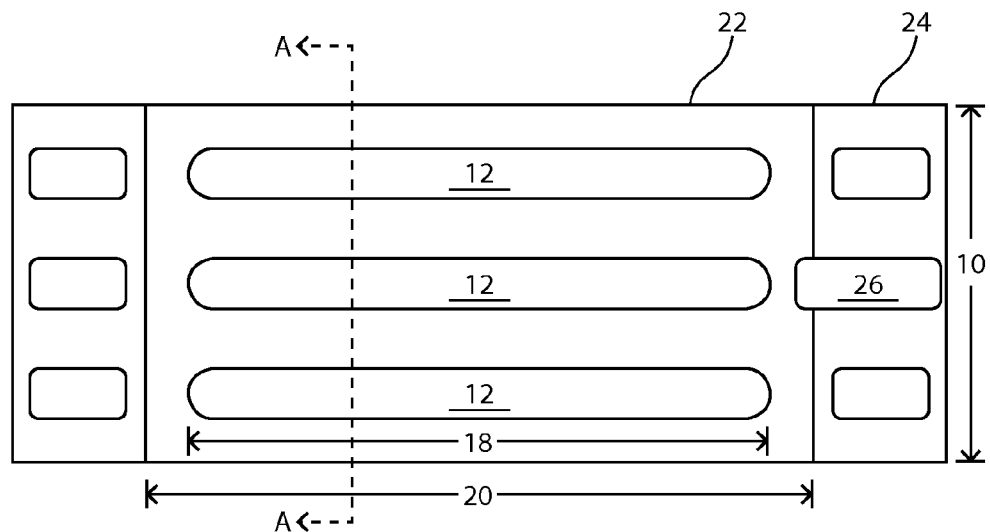
FIG. 2 includes a side elevation view of a tolerance ring in accordance with an embodiment.

Referring now to FIG. 2, when viewed from a side elevation view, each sidewall segment 6 can define a surface area, $SA_{SWS}$, when measured in the unassembled state, and as bound by a height and a length of the sidewall segment 6. The stiffeners 12 disposed on the sidewall segment 6 can define a surface area, $SA_S$, as measured by the total surface area that all of the stiffeners 12 on the measured sidewall segment 6 occupy when viewed in a direction normal to an undeformed location of the sidewall segment, e.g., a location devoid of stiffeners 12. $SA_S$ can include any portion of the stiffeners 12 bound by the sidewall segment 6 that does not lie along a plane formed by the surface of the sidewall segment 6. The surface areas, $SA_S$ and $SA_{SWS}$, are to be measured when viewed in a direction normal to the sidewall segment 6 at an undeformed location. It should be understood that for purpose of calculations $SA_{SWS}$ can include $SA_S$.

In a particular embodiment, $SA_{SWS}$ can be greater than $SA_S$. For example, in a further embodiment, $SA_S$ can be no greater than 0.99 $SA_{SWS}$, such as no greater than 0.90 $SA_{SWS}$, no greater than 0.85 $SA_{SWS}$, no greater than 0.80 $SA_{SWS}$, no greater than 0.75 $SA_{SWS}$, no greater than 0.70 $SA_{SWS}$, no greater than 0.65 $SA_{SWS}$, no greater than 0.60 $SA_{SWS}$, no greater than 0.55 $SA_{SWS}$, no greater than 0.50 $SA_{SWS}$, no greater than 0.45 $SA_{SWS}$, no greater than 0.40 $SA_{SWS}$, no greater than 0.35 $SA_{SWS}$, no greater than 0.30 $SA_{SWS}$, or even no greater than 0.20 $SA_{SWS}$. In yet a further embodiment, $SA_S$ can be no less than 0.01 $SA_{SWS}$, such as no less than 0.05 $SA_{SWS}$, no less than 0.10 $SA_{SWS}$, or even no less than 0.15 $SA_{SWS}$. In this regard, in a particular embodiment, the stiffeners 12 can take up no less than 1% and no greater than 99% of the normal surface area of each sidewall segment 6.

In a particular embodiment, at least one stiffener 12 can extend along a line oriented substantially perpendicular to a height, $H_{SS}$ (illustrated in FIG. 2 at 16), of the sidewall segment 6. As used herein, "substantially perpendicular" refers to a deviation of no greater than 5° between the measured directions of two lines, such as no greater than 4°, no greater than 3°, or even no greater than 2°. In a more particular embodiment, at least one stiffener 12 can extend along a line oriented perpendicular to the height, $H_{SS}$, of the sidewall segment 6. As used herein, "oriented perpendicular" refers to a deviation of no greater than 0.5° as measured between the two compared lines.

Referring still to FIG. 2, each sidewall segment can define a length, $L_{SS}$ (illustrated in FIG. 2 at 20), and each stiffener can define a length, $L_S$ (illustrated in FIG. 2 at 18). In a particular embodiment, $L_S$ can be less than $L_{SS}$. For example, $L_S$ can be no greater than 0.99 $L_{SS}$, such as no greater than 0.95 $L_{SS}$, no greater than 0.90 $L_{SS}$, no greater than 0.85 $L_{SS}$, no greater than 0.75 $L_{SS}$, or even no greater than 0.50 $L_{SS}$. Moreover, $L_S$ can be no less than 0.1 $L_{SS}$, such as no less than 0.25 $L_{SS}$, or even no less than 0.45 $L_{SS}$.

In a particular embodiment, at least one stiffener 12 can be positioned on the tolerance ring 2 so as to contact a first sidewall segment 22 and terminate prior to contacting a second sidewall segment 24. In this regard, the at least one stiffener 12 can be disposed on only one sidewall segment 6.

In another embodiment, at least one stiffener 26 can extend between adjacent sidewall segments 22 and 24. In such a manner, the stiffener 26 can transect a junction formed between adjacent sidewall segments 22 and 24 and can extend along at least a portion of each adjacent sidewall segment 22 and 24. In a further embodiment, multiple stiffeners 26 can transect the junction between adjacent sidewall segments 22 and 24. A person of ordinary skill will understand after reading the entire specification, that it may be preferred to have each stiffener 12 disposed only on a single sidewall segment 6. As will be discussed in greater detail below, a tolerance ring 2 in accordance with one or more of the embodiments described herein, can contact an outer component at circumferential ends of each sidewall segment 6. It this regard, it may be desirable for an undeformed portion of the sidewall segment 6, e.g., a portion of each sidewall segment devoid of a stiffener, to contact the outer component. In such a manner, the contact can be flush, i.e., each sidewall segment 6 can contact the outer component along an entire axial length thereof.

Figure 3:
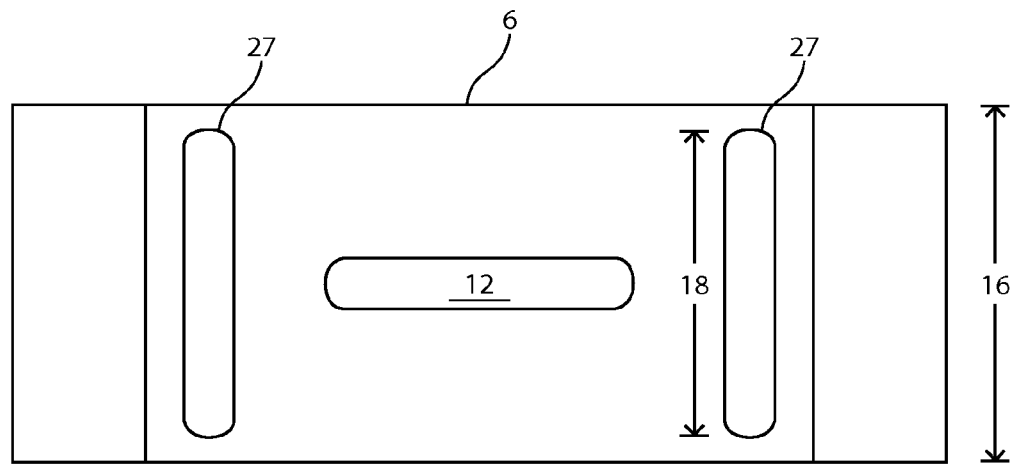
FIG. 3 includes a side elevation view of a tolerance ring in accordance with an embodiment.

In yet another embodiment, such as, for example, illustrated in FIG. 3, at least one stiffener 27 can extend along a line oriented parallel to the height 16 of the sidewall segment 6. In a particular embodiment, the length of the stiffener, $L_{SS}$ (illustrated in FIG. 3 at 18) can be less than the height of the sidewall segment, $H_{SS}$ (illustrated in FIG. 3 at 16). For example, $L_S$ can be no greater than 0.99 $H_{SS}$, such as no greater than 0.95 $H_{SS}$, no greater than 0.90 $H_{SS}$, no greater than 0.85 $H_{SS}$, no greater than 0.75 $H_{SS}$, or even no greater than 0.50 $H_{SS}$. Moreover, $L_S$ can be no less than 0.1 $H_{SS}$, such as no less than 0.25 $H_{SS}$, or even no less than 0.45 $H_{SS}$.

In a particular embodiment, the stiffeners 12, 26, and 27 can all be oriented in different directions relative to each other. For example, as illustrated in FIG. 3, a central stiffener 12 can extend in a direction perpendicular to the height 16 of the sidewall segment 6, while one or more outer stiffeners 27 can extend in a direction parallel to the height 16 of the sidewall segment 6. Moreover, it should be understood that the scope of the disclosure is not intended to be limited by this exemplary embodiment. A person of ordinary skill in the art will understand that the stiffeners can be arranged on each sidewall segment in various arrangements and configurations, having various dimensions, characteristics, orientations, and properties as described herein.

Figure 4A:
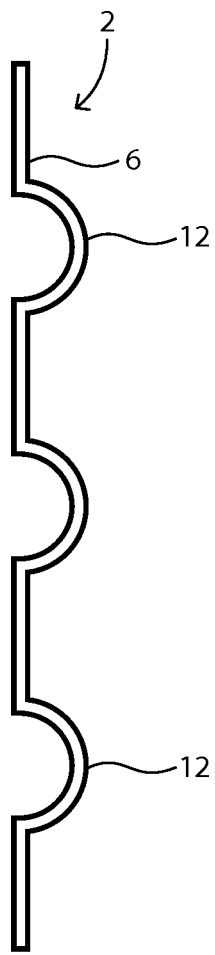
FIGS. 4A and 4B includes cross-sectional side views of tolerance rings in accordance with embodiments described herein, as seen along Line A-A in FIG. 2.
Figure 4B:
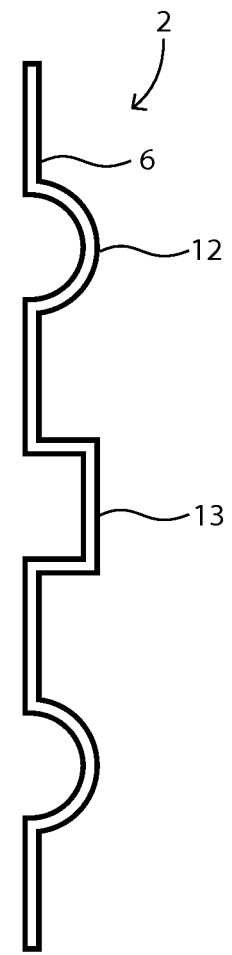

Referring now to FIGS. 4A and 4B, in a particular embodiment, at least a portion of at least one stiffener 12 can have an arcuate contour when viewed in cross-section (FIG. 4A). In another embodiment, at least a portion of at least one stiffener 13 can have a polygonal contour when viewed in cross-section (FIG. 4B). The polygonal contour can include, for example, a triangular contour, a quadrilateral contour (as illustrated as the central stiffener 13 in FIG. 4B), a pentagonal contour, a hexagonal contour, a heptagonal contour, or even an octagonal contour. As illustrated in FIG. 4B, in a particular embodiment, the stiffeners 12 and 13 disposed on each sidewall segment 6 can have a different or unique contour when viewed in cross section. Additionally, each stiffener 12 can have an arcuate contoured portion and a polygonal contoured portion. In such a manner, the stiffeners 12 can be varied and altered for specific applications.

During and after assembly, at least one of the stiffeners 12 can operate in an elastic zone of deformation, i.e., the at least one stiffener 12 can be capable of deforming upon application of a force and returning to its original shape after removal of the force. In a further embodiment, at least one of the stiffeners 12 can operate in a plastic zone of deformation, i.e., the at least one stiffener 12 can be incapable of fully returning to its original shape after removal the force. It may be possible, by including stiffeners of different deformation characteristics on a single sidewall segment 6, to yet further alter the characteristics of the tolerance ring 2, e.g., stiffness, sliding capability, or tolerance absorption.

A tolerance ring 2 in accordance with one or more of the embodiments described herein can have a sidewall segment stiffness (an indicator of the sidewall segments resistance to deformation under load) which is at least 1% greater than a same tolerance ring devoid of a stiffener, such as at least 5% greater than a same tolerance ring devoid of a stiffener, at least 10% greater than a same tolerance ring devoid of a stiffener, or even at least 20% stiffer as compared to a same tolerance ring devoid of a stiffener. In this regard, it may be possible for a tolerance ring 2 in accordance with embodiments herein to span a large radial gap between an inner and outer component without substantially altering radial strength or slip characteristics of the tolerance ring 2. As used herein, "span" refers to contact between the tolerance ring 2 and both the inner and outer components. More particularly, "span" can refer to a degree of contact that allows for transmission of force between the inner and outer components.

In a further embodiment, the tolerance ring can further define at least one aperture extending through at least one of the sidewall segments. The aperture can be disposed along the sidewall segment along an undeformed portion thereof, along one or more of the stiffeners, or along a combination thereof. In this regard, the sidewall segment stiffness can be further altered and adjusted for particular applications. For example, a sidewall segment having a central aperture may have a lower stiffness, making the sidewall segment more likely bend to absorb tolerances and deflect upon loading conditions.

Figure 5:
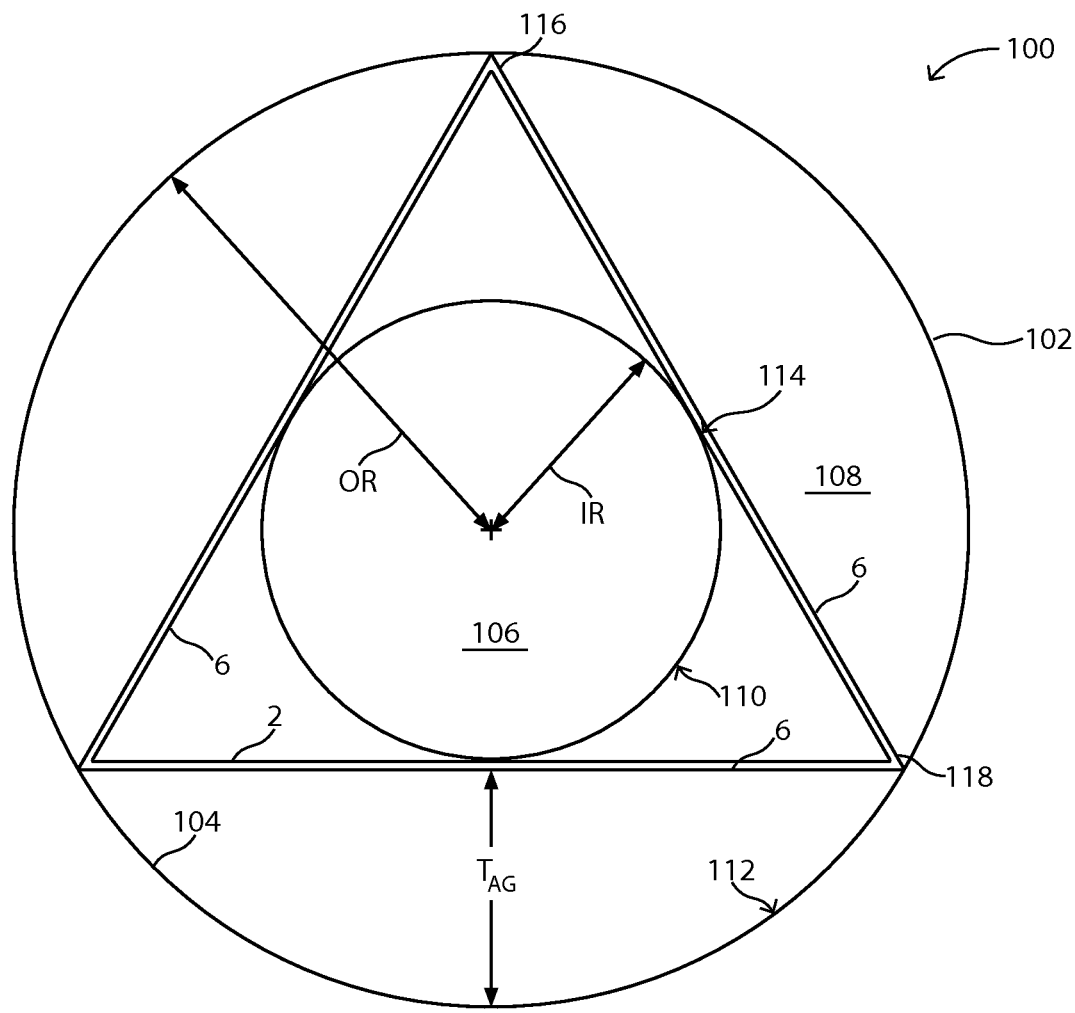
FIG. 5 includes a top view of an assembly including a tolerance ring in accordance with an embodiment.

Referring now to FIG. 5, an assembly 100 in accordance with one or more of the embodiments described herein can generally include an outer component 102 defining a bore 104 and an inner component 106 disposed within the bore 104 of the outer component 102. A tolerance ring 2 can be disposed between the outer component 102 and the inner component 106 so as to span a radial gap 108 formed therebetween.

In an embodiment, when a diameter of the inner component 106 is less than 30 mm, the tolerance ring 2 can span a radial gap 108 having a radial distance of at least 10% of the diameter of the inner component, such as at least 15% of the diameter, at least 20% of the diameter, or even at least 25% of the diameter. As used herein, "radial distance" refers to a shortest distance between coaxial inner and outer components. In another embodiment, when the diameter of the inner component 106 is at least 30 mm, the tolerance ring 2 can span a radial gap 108 having a radial distance of at least 3 mm, such as at least 4 mm, at least 5 mm, or even at least 10 mm. In a further embodiment, the tolerance ring 106 can span a radial gap 108 having a radial distance of no greater than 250 mm, such as no greater than 200 mm, no greater than 100 mm, or even no greater than 50 mm.

In accordance with an embodiment described herein, the tolerance ring 2 can have a plurality of sidewall segments 6. Each sidewall segment 6 can contact an outer surface 110 of the inner component 106 so as to form at least one point of contact with the inner component 106. In a more particular embodiment, the point of contact between the tolerance ring 2 and the inner component 106 can occur at a middle portion 114 of each sidewall segment 6. In a particular embodiment, the point of contact between the inner component 106 and the middle portion 114 of each sidewall segment 6 can be a point or line contact, e.g., contact formed along a single point or along a single line. Alternatively, the point of contact can be an area contact, e.g., contact formed at an area as measured in a direction parallel to both the length and the height of each sidewall segment 6.

In a further embodiment, each sidewall segment 6 can contact an inner surface 112 of the outer component 102 so as to form at least one point of contact with the outer component 102. In a more particular embodiment, the point of contact between the tolerance ring 2 and the outer component 102 can occur at opposite circumferential ends 116 and 118 of each sidewall segment 6. In this regard, it may be possible for each sidewall segment 6 to form three contact points between the inner and outer components 106 and 102—two supporting contact points at circumferential ends 116 and 118, and a loaded contact point at the middle portion 114.

The radial gap 108 can define an inner radius, IR, as defined by the outer surface 110 of the inner component 106, and an outer radius, OR, as defined by the inner surface 112 of the outer component 102. The radial gap 108 can have a radial thickness, $T_{AG}$, as measured by a difference between OR and IR. A radial gap aspect ratio can be defined by a ratio of IR/OR.

A person of ordinary skill in the art will understand after reading the entire specification that the number of sidewall segments 6 necessary to span a radial gap 108 can vary based on several variables, such as, for example, the radial gap aspect ratio, the thicknesses, $T_{SS}$ and $T_S$, of the sidewall segments 6, and the desired loading forces, e.g., the slip characteristic, the minimum and maximum allowed radial forces, and the acceptable bending condition of each sidewall segment 6. In this regard, a first step in determining the number of sidewall segments 6 for a particular radial gap aspect ratio can include calculating a theoretical number of sidewall segments using the following equation:

$$n = \frac{180}{\cos^{-1}\left(\frac{IR}{OR}\right)} \quad \text{(equation 1)}$$

where n represents a theoretical number of sidewall segments 6 necessary for the tolerance ring 2 to perfectly, or nearly perfectly, fit in the radial gap 108, and where IR/OR is the radial gap aspect ratio. Using equation 1, it may be possible to determine an appropriate number of sidewall segments 6 in an unloaded, or unbent, tolerance ring configuration (such as illustrated in FIG. 5). For example, using equation 1, an inner component 106 having a diameter of 8 mm disposed within an outer component 102 having a bore 104 with a diameter of 16 mm can perfectly, or nearly perfectly, fit a tolerance ring having 3 sidewall segments 6 without deforming any portion of the tolerance ring 2. Likewise, an inner component 106 having a diameter of 10.0 mm disposed within an outer component 102 having a bore 104 with a diameter of 14.142 mm can perfectly, or nearly perfectly, fit a tolerance ring having 4 sidewall segments 6 without deforming any portion of the tolerance ring 2. As used herein, "perfectly fit" refers to a size ratio between two objects as 1:1. More specifically, as used herein "perfectly fit" can refer to a 1:1 ratio of the effective radial thickness of a tolerance ring, $RT_E$, to $T_{AG}$. In other words, a perfectly fit tolerance ring can be disposed between inner and outer components with the tolerance ring exhibiting no deflection or loading forces, while each sidewall segment can simultaneously form three points of contact with the inner and outer components—two points of contact with the outer component and one point of contact with the inner component. As used herein, "nearly perfectly fit" refers to a deviation from a 1:1 ratio between the effective radial thickness and $T_{AG}$ by less than 5%, such as by less than 4%, less than 3%, less than 2%, or even less than 1%. A person of ordinary skill in the art will understand that equation 1 can be adjusted to account for the thickness of the sidewall segments 6.

In applications where n is not a whole number, e.g., an inner component 106 having a diameter of 20 mm disposed within an outer component 102 having a bore 104 with a diameter of 26 mm requires use of a tolerance ring having 4.533 sidewall segments 6, it may be necessary to adjust the tolerance ring 2 in one of several ways.

Because the number of sidewall segments 6 required in the last example is between 4.0 and 5.0 it may be acceptable, depending on the application, to utilize a tolerance ring 2 having either 4 or 5 sidewall segments. By rounding to the nearest whole number of sidewall segments, e.g., to 4 or five equilateral sidewall segments, an unbalanced radial load may be avoided. In a particular embodiment, it may be advantageous to utilize the lower number of sidewall segments, thereby increasing the circumferential size of the axial gap 10.

Figure 6:
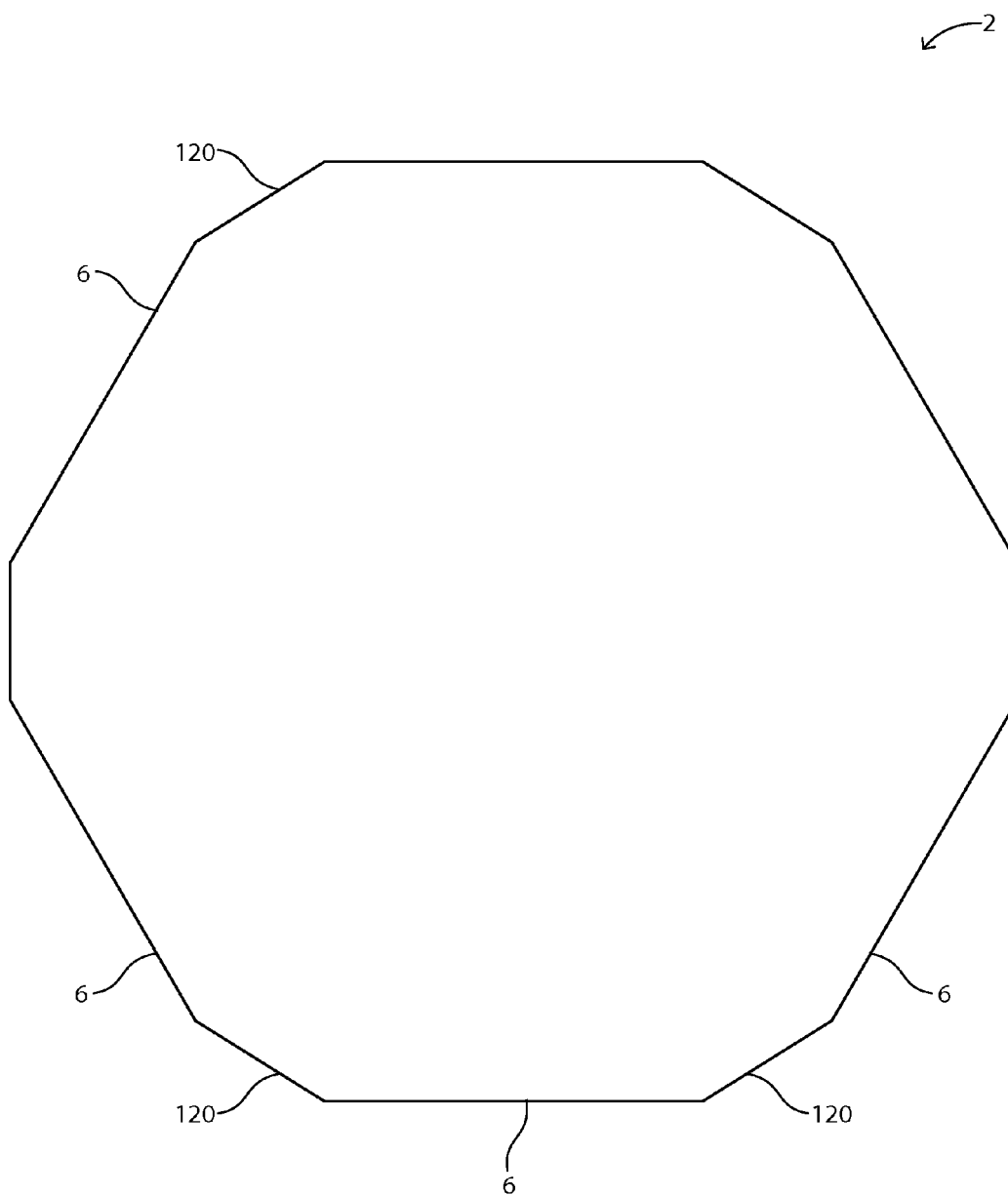
FIG. 6 includes a top view of a tolerance ring in accordance with an embodiment.

In addition to rounding to the lower whole number of sidewall segments 6, it may be beneficial to further include one or more partial sidewall segments 120 in the tolerance ring 2. As illustrated in FIG. 6, these partial sidewall segments 120 may be positioned between some, or all, of the adjacent sidewall segments 6 and 6. The partial sidewall segments 120 can be sized appropriately to accommodate for radial gaps having off-sized radial gap aspect ratios. Alternatively, or in addition, in a non-illustrated embodiment, the partial sidewall segments can be disposed at the circumferential ends of the sidewall segments nearest the axial gap. In such a manner, the partial sidewall segments can close the axial gap and may reduce eccentric loading conditions around the tolerance ring 2.

Figure 7:
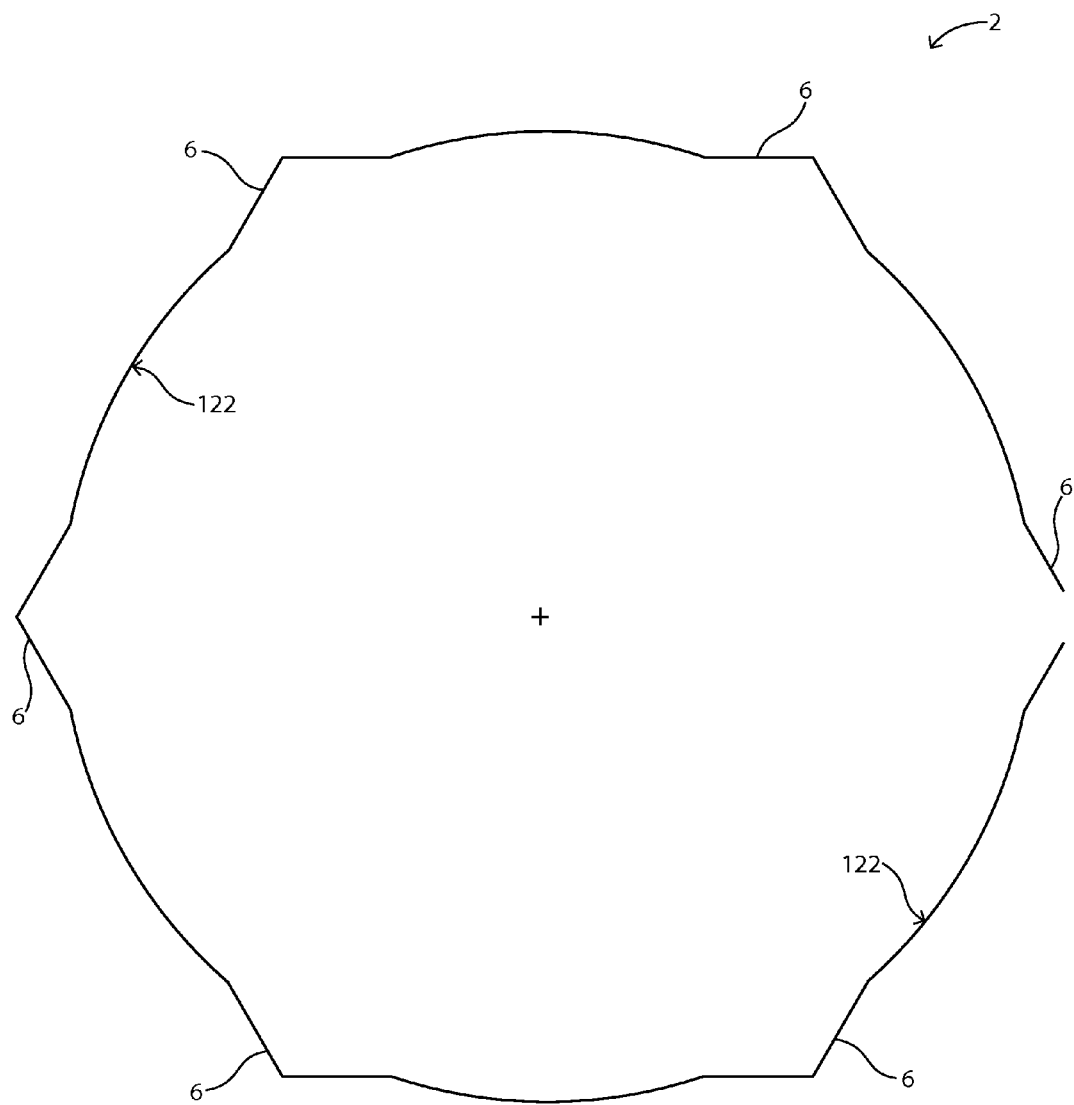
FIG. 7 includes a top view of a tolerance ring in accordance with an embodiment.

Alternatively, in a particular embodiment, any number of additional features can be added to the tolerance ring 2 which may further accommodate fractional sidewall segment values. For example, referring to FIG. 7, a cradle portion 122 can be disposed along one or more of the sidewall segments 6. The cradle portion 122 can be shaped to receive a cylindrical, or generally cylindrical, inner component. In a more particular embodiment, the cradle portion 122 can have a radius of curvature that is similar to the radius of the inner component. For example, the radius of curvature of the cradle portion 122 can be within 10% of the radius of the inner component, such as within 5%, within 4%, or even within 3%. In this regard, the cradle portion 122 can provide circumferential support to at least a portion of the inner component.

Figure 8:
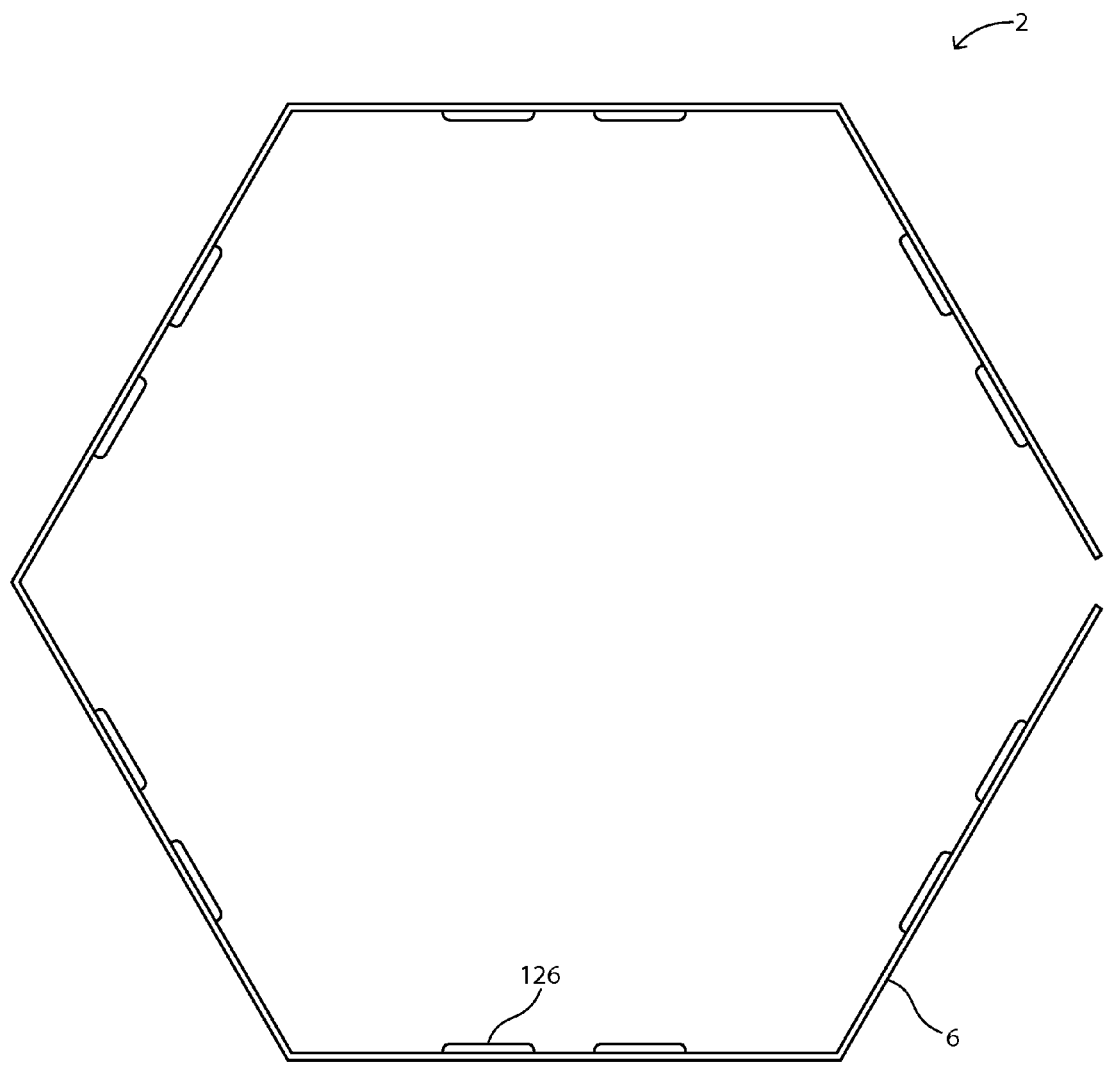
FIG. 8 includes a top view of a tolerance ring in accordance with an embodiment.

Referring now to FIG. 8, in a further embodiment, tolerance ring 2 can further include a pad 126. The pad 126 can be adapted to sit flush with the inner component 106. The pad 126 can contact the inner component and provide an intermediary between the inner component 106 and an inner surface of the tolerance ring 2. In a particular embodiment, the pad 126 can be disposed on the cradle portion 122. Alternatively, as illustrated in FIG. 8, the pad 126 can be disposed directly on the sidewall segment 6 of the tolerance ring. In further embodiments, the tolerance ring 2 can include a plurality of pads 126. In yet further embodiments, at least two pads 126 can be disposed on each sidewall segment 6 or along each cradle portion 122. The pads 126 can provide discrete contact points between the tolerance ring 2 and the inner component 106.

In a particular embodiment, the pad 126 can at least partially comprise a metal, a ceramic, or any combination thereof. Moreover, in a non-limiting embodiment, the pad 126 can at least partially include a polymer. Exemplary polymers can include a polyketone, polyaramid, a polyimide, a polytherimide, a polyphenylene sulfide, a polyethersulfone, a polysulfone, a polypheylene sulfone, a polyamideimide, ultra high molecular weight polyethylene, a fluoropolymer, a polyamide, a polybenzimidazole, or any combination thereof.

In an example, the polymer can include a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the polymer can include a polyketone, such as polyether ether ketone (PEEK), polyether ketone, polyether ketone ketone, polyether ketone ether ketone, a derivative thereof, or a combination thereof. In an additional example, the polymer may be ultra high molecular weight polyethylene.

An example fluoropolymer can include fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof.

In yet a further embodiment, in sliding applications, a lubricant can be disposed in, or on, the pad 126 or along a surface of at least one of the sidewall segments 6. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof.

After the number of sidewall segments 6 necessary for an unloaded, e.g., undeformed tolerance ring, has been determined using equation 1, radial stiffness, slip characteristics, loading conditions, and other application specific modifications can be made to the tolerance ring 2 by adjusting the number, shape, and size of the sidewall segments 6, the stiffeners 12, and any other features of the tolerance ring 2. For example, in a non-limiting embodiment, a radial gap 108 having a radial gap aspect ratio of $\sqrt{2}$ can perfectly fit, without loading characteristics, a tolerance ring 2 having four sidewall segments 6, e.g., a quadrilateral tolerance ring. Disposing a tolerance ring 2 having three sidewall segments 6 within said radial gap may permit a radial loading between the inner component, the tolerance ring, and the outer component, thereby altering the characteristics of the assembly.

Similarly, in another, non-limiting embodiment, a radial gap 108 having a radial gap aspect ratio of approximately 1.2361 can nearly perfectly fit, without loading characteristics, a tolerance ring 2 having five sidewall segments 6, e.g., a pentagonal tolerance ring. Disposing a partial sidewall segment 120 between each of the adjacent sidewall segments 6 of the pentagonal tolerance ring, can permit a radial loading between the inner component, the tolerance ring, and the outer component, thereby altering the characteristics of the assembly.

Similar modifications can be affected by adjusting any additional features, e.g., the cradle 122 or the pad 126, by adjusting the thicknesses of the sidewall segments 6 and the stiffeners 12, or even by adding additional polygon structures to the tolerance ring 2.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A tolerance ring comprising:
a body including a plurality of sidewall segments, each sidewall segment having a thickness and a height,
wherein the body has an aspect ratio, as measured by a ratio of the height of the sidewall segment to the thickness of the sidewall segment, of no less than 2:1.

Item 2. A tolerance ring comprising:
a body including a plurality of sidewall segments, each sidewall segment having a thickness and a height; and
a stiffener disposed on a sidewall segment of the body, wherein the stiffener comprises a projection extending from the sidewall segment.

Item 3. An assembly comprising:
an outer component defining a bore;
an inner component disposed within the bore of the outer component; and
a tolerance ring disposed between the inner and outer components, the tolerance ring comprising:
a body including a plurality of sidewall segments, each sidewall segment having a thickness and a height,
wherein each sidewall segment contacts the inner component.

Item 4. A tolerance ring adapted to be disposed within a radial gap between an inner component and an outer component, the inner component having a diameter, and the radial gap having a radial distance of:
(i) at least 10% of the diameter of the inner component for diameters of less than 30 mm; or
(ii) at least 3 mm for diameters of at least 30 mm.

Item 5. An assembly comprising:
an outer component defining a bore;
an inner component disposed within the bore of the outer component and defining a radial gap between the inner and outer components, the inner component having a diameter; and
a tolerance ring disposed within the radial gap,
wherein the radial gap has a radial distance of:
(i) at least 10% of the diameter of the inner component for diameters of less than 30 mm; or
(ii) at least 3 mm for diameters of at least 30 mm.

Item 6. The tolerance ring or assembly according to any one of items 4 and 5, wherein the tolerance ring further comprises a body including a plurality of sidewall segments, each sidewall segment having a thickness and a height.

Item 7. The tolerance ring or assembly according to any one of items 1-3 and 6, wherein each sidewall segment defines a nominal thickness as measured at an undeformed portion of the sidewall segment, and wherein each sidewall segment defines an effective thickness as measured at the stiffener.

Item 8. The tolerance ring or assembly according to any one of items 2, 3, 6, and 7, wherein the body has an aspect ratio as measured by a ratio of the height of the sidewall segment to the thickness of the body, of no less than 2:1.

Item 9. The tolerance ring or assembly according to any one of items 1 and 8, wherein the aspect ratio is no less than 3:1, such as no less than 4:1, no less than 5:1, no less than 10:1, or even no less than 20:1.

Item 10. The tolerance ring or assembly according to any one of items 1, 8, and 9, wherein the aspect ratio is no greater than 200:1, such as no greater than 100:1, or even no greater than 50:1.

Item 11. The tolerance ring according to any one of items 1-3 and 6-10, wherein the tolerance ring is adapted to be disposed within a radial gap between an inner component and an outer component.

Item 12. The tolerance ring or assembly according to any one of items 4, 5, and 11, wherein the tolerance ring is adapted to span the radial gap.

Item 13. The tolerance ring or assembly according to any one of items 1, 3 and 6-12, wherein the tolerance ring further comprises a stiffener disposed on a sidewall segment of the plurality of sidewall segments.

Item 14. The tolerance ring or assembly according to any one of items 2 and 13, wherein the stiffener comprises a projection extending from the sidewall segment.

Item 15. The tolerance ring or assembly according to any one of items 2, 13, and 14, wherein the stiffener extends radially outward from the tolerance ring.

Item 16. The tolerance ring or assembly according to any one of items 2, 13, and 14, wherein the stiffener extends radially inward from the tolerance ring.

Item 17. The tolerance ring or assembly according to any one of items 2 and 13-16, wherein the stiffener is oriented perpendicular to the height of the sidewall segment.

Item 18. The tolerance ring or assembly according to any one of items 2 and 13-16, wherein the sidewall segment defines a length, $L_{SS}$, wherein the stiffener defines a length, $L_S$, and wherein $L_S$ is less than $L_{SS}$.

Item 19. The tolerance ring or assembly according to item 18, wherein $L_S$ is no greater than 0.99 $L_{SS}$, such as no greater than 0.95 $L_{SS}$, no greater than 0.90 $L_{SS}$, no greater than 0.85 $L_{SS}$, no greater than 0.75 $L_{SS}$, or even no greater than 0.50 $L_{SS}$.

Item 20. The tolerance ring or assembly according to any one of items 18 and 19, wherein $L_S$ is no less than 0.10 $L_{SS}$, such as no less than 0.25 $L_{SS}$, or even no less than 0.45 $L_{SS}$.

Item 21. The tolerance ring or assembly according to any one of items 2 and 13-20, wherein the stiffener extends along a first sidewall segment of the plurality of sidewall segments and terminates prior to contacting a second sidewall segment of the plurality of sidewall segments.

Item 22. The tolerance ring or assembly according to any one of items 2 and 13-20, wherein the stiffener extends along at least two sidewall segments of the plurality of sidewall segments.

Item 23. The tolerance ring or assembly according to any one of items 2 and 13-16, wherein the stiffener is oriented parallel to the height of the sidewall segment.

Item 24. The tolerance ring or assembly according to any one of items 2, 13-16, and 23, wherein the stiffener has a length $L_S$, and wherein $L_S$ is less than the height of the sidewall segment, $H_{SS}$.

Item 25. The tolerance ring or assembly according to item 24, wherein $L_S$ is no greater than 0.99 $H_{SS}$, such as no greater than 0.95 $H_{SS}$, no greater than 0.90 $H_{SS}$, no greater than 0.85 $H_{SS}$, no greater than 0.75 $H_{SS}$, or even no greater than 0.50 $H_{SS}$.

Item 26. The tolerance ring or assembly according to any one of items 24 and 25, wherein $L_S$ is no less than 0.10 $H_{SS}$, such as no less than 0.25 $H_{SS}$, or even no less than 0.45 $H_{SS}$.

Item 27. The tolerance ring or assembly according to any one of items 2 and 13-26, wherein the stiffener is monolithic with the sidewall segment.

Item 28. The tolerance ring or assembly according to any one of items 2 and 13-26, wherein the stiffener is engaged with the sidewall segment by a fastening element, an adhesive, mechanical deformation, or a combination thereof.

Item 29. The tolerance ring or assembly according to any one of items 2 and 13-26, wherein at least a portion of the stiffener has an arcuate contour.

Item 30. The tolerance ring or assembly according to any one of items 2 and 13-29, wherein at least a portion of the stiffener has a polygonal contour.

Item 31. The tolerance ring or assembly according to any one of items 2 and 13-30, wherein the stiffener is adapted to operate in an elastic zone of deformation.

Item 32. The tolerance ring or assembly according to any one of items 2 and 13-31, wherein the tolerance ring comprises a plurality of stiffeners.

Item 33. The tolerance ring or assembly according to item 32, wherein each sidewall segment of the plurality of sidewall segments includes at least one stiffener.

Item 34. The tolerance ring or assembly according to any one of items 32 and 33, wherein at least one sidewall segments of the plurality of sidewall segments includes at least two stiffeners.

Item 35. The tolerance ring or assembly according to any one of items 32-34, wherein at least one of the stiffeners extends radially outward from the body.

Item 36. The tolerance ring or assembly according to any one of items 2 and 13-35, wherein the sidewall segment has a stiffness which is at least 1% stiffer as compared to a same sidewall segment devoid of a stiffener, such as at least 5% stiffer as compared to a same sidewall segment devoid of a stiffener, at least 10% stiffer as compared to a same sidewall segment devoid of a stiffener, or even at least 20% stiffer as compared to a same sidewall segment devoid of a stiffener.

Item 37. The tolerance ring or assembly according to any one of items 2 and 13-36, wherein, when viewed from a side view, each sidewall segment has a surface area, $SA_{SWS}$, and each stiffener has a surface area, $SA_S$, and wherein $SA_S$ is no greater than 0.90 $SA_{SWS}$, such as no greater than 0.75 $SA_{SWS}$, no greater than 0.50 $SA_{SWS}$, or even no greater than 0.25 $SA_{SWS}$.

Item 38. The tolerance ring or assembly according to any one of items 1-3 and 6-37, wherein the body comprises at least 3 sidewall segments, such as at least 4 sidewall segments, at least 5 sidewall segments, at least 6 sidewall segments, at least 7 sidewall segments, at least 8 sidewall segments, at least 9 sidewall segments, at least 10 sidewall segments, at least 15 sidewall segments, or even at least 20 sidewall segments.

Item 39. The tolerance ring or assembly according to any one of items 1-3 and 6-38, wherein the body comprises no greater than 75 sidewall segments, such as no greater than 50 sidewall segments, or even no greater than 25 sidewall segments.

Item 40. The tolerance ring or assembly according to any one of items 1-3 and 6-39, wherein a first sidewall segment is oriented with respect to a second sidewall segment at an angle, A, and wherein A is no less than 60°, such as no less than 90°, no less than 120°, or even no less than 150°.

Item 41. The tolerance ring or assembly according to item 40, wherein A is less than 180°, such as no greater than 170°, no greater than 160°, no greater than 150°, no greater than 140°, no greater than 130°, no greater than 120°, or even no greater than 110°.

Item 42. The tolerance ring or assembly according to any one of items 1-3 and 6-41, wherein at least one sidewall segment of the plurality of sidewall segments is adapted to deflect upon being disposed within a radial gap between an inner component and an outer component.

Item 43. The tolerance ring or assembly according to any one of items 1-3 and 6-42, wherein all sidewall segments of the plurality of sidewall segments are adapted to deflect upon being disposed within a radial gap between an inner component and an outer component.

Item 44. The tolerance ring or assembly according to any one of items 1-3 and 6-43, wherein at least one sidewall segment of the plurality of sidewall segments is adapted to act as a beam.

Item 45. The tolerance ring or assembly according to any one of items 1-3 and 6-44, wherein all sidewall segments of the plurality of sidewall segments are adapted to act as a beam.

Item 46. The tolerance ring or assembly according to any one of items 1-3 and 6-45, wherein each sidewall segment of the plurality of sidewall segments defines a spring rate, and wherein the spring rate of each sidewall is identical.

Item 47. The tolerance ring or assembly according to any one of items 1-3 and 6-46, wherein at least two sidewall segments have the same dimensions.

Item 48. The tolerance ring or assembly according to any one of items 1-3 and 6-47, wherein at least two sidewall segments have different dimensions.

Item 19. The tolerance ring or assembly according to any one of items 1-3 and 6-48, wherein at least one sidewall segment of the plurality of sidewall segments is adapted to form at least one point of contact with an inner component.

Item 50. The tolerance ring or assembly according to item 49, wherein the at least one point of contact is located at a middle portion of the at least one sidewall segment.

Item 51. The tolerance ring or assembly according to any one of items 1-3 and 6-50, wherein each sidewall segment of the plurality of sidewall segments is adapted to form at least one point of contact with an inner component.

Item 52. The tolerance ring or assembly according to any one of items 1-3 and 6-51, wherein at least one sidewall segment of the plurality of sidewall segments is adapted to form at least one point of contact with an outer component.

Item 53. The tolerance ring or assembly according to any one of items 1-3 and 6-52, wherein each sidewall segment of the plurality of sidewall segments is adapted to form two points of contact with an outer component.

Item 54. The tolerance ring or assembly according to any one of items 1-3 and 6-53, wherein a majority of each sidewall segment lies along a plane.

Item 55. The tolerance ring or assembly according to any one of items 1-3 and 6-54, wherein each sidewall segment is generally planar in an unassembled state.

Item 56. The tolerance ring or assembly according to any one of the preceding items, wherein the tolerance ring is adapted to be installed within a radial gap between an inner component and an outer component, and wherein the radial gap has a radial distance of:

(i) at least 10% of a diameter of the inner component for diameters of less than 30 mm, such as at least 15% of the diameter for diameters of less than 30 mm, at least 20% of the diameter for diameters of less than 30 mm, or even at least 25% of the diameter for diameters of less than 30 mm; or (ii) at least 3 mm for diameters of at least 30 mm, such as at least 4 mm for diameters of at least 30 mm, at least 5 mm for diameters of at least 30 mm, or even at least 10 mm, for diameters of at least 30 mm.

Item 57. The tolerance ring or assembly according to any one of the preceding items, wherein the tolerance ring is adapted to be installed within a radial gap between an inner component and an outer component, and wherein the radial gap has a radial distance of no greater than 250 mm, such as no greater than 200 mm, no greater than 100 mm, or even no greater than 50 mm.

Item 58. The tolerance ring or assembly according to any one of the preceding items, wherein the tolerance ring comprises a metal.

Item 59. The tolerance ring or assembly according to any one of the preceding items, wherein the tolerance ring comprises spring steel.

Item 60. The tolerance ring or assembly according to any one of the preceding items, wherein the tolerance ring comprises a polymer.

Item 61. The tolerance ring or assembly according to any one of the preceding items, wherein the tolerance ring further comprises a polymer coating.

Item 62. The tolerance ring or assembly according to any one of items 1-3 and 6-61, wherein at least one sidewall segment defines a hole extending from a first sidewall of the sidewall segment to a second sidewall of the sidewall segment.

Item 63. The tolerance ring or assembly according to any one of items 1-3 and 6-62, wherein each sidewall segment defines a hole extending from a first sidewall of the sidewall segment to a second sidewall of the sidewall segment.

Item 64. The tolerance ring or assembly according to any one of items 1-3 and 6-63, wherein at least one sidewall segment defines a thin portion extending from one of a first sidewall of the sidewall segment and a second sidewall of the sidewall segment toward the other of the first sidewall of the sidewall segment and a second sidewall of the sidewall segment.

Item 65. The tolerance ring or assembly according to any one of the preceding items, wherein the tolerance ring further comprises a low friction material affixed to at least a portion of at least one sidewall segment.

Item 66. The tolerance ring or assembly according to any one of the preceding items, wherein the tolerance ring further comprises a high friction material affixed to at least a portion of at least one sidewall segment.

Item 67. The tolerance ring or assembly according to any one of the preceding items, wherein the tolerance ring further comprises at least one cradle portion disposed along at least one sidewall segment.

Item 68. The tolerance ring or assembly according to item 67, wherein the cradle portion is adapted to provide circumferential support to a portion of an inner component disposed within the tolerance ring.

Item 69. The tolerance ring or assembly according to any one of items 67 and 68, wherein the cradle portion further comprises a pad adapted to contact an inner component.

Item 70. A tolerance ring having a plurality of sidewall segments, wherein at least a majority of each sidewall segment lies along a plane, and wherein the tolerance ring has at least three rotationally symmetrical orientations.

Item 71. The tolerance ring according to item 70, wherein at least 75% of each sidewall segment lies along a plane, such as wherein at least 80% of each sidewall segment lies along a plane, wherein at least 85% of each sidewall segment lies along a plane, wherein at least 90% of each sidewall segment lies along a plane, or even wherein at least 95% of each sidewall segment lies along a plane.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A tolerance ring comprising:
a body including a plurality of planar sidewall segments, each sidewall segment having a thickness and a height, wherein each pair of sidewall segments meet at an angle A, wherein each angle is no less than 60°,
wherein the body has an aspect ratio, as measured by a ratio of the height of the sidewall segment to the thickness of the sidewall segment, of at least 2:1, wherein each sidewall segment is generally planar in an unassembled state, and wherein at least one sidewall segment of the plurality of sidewall segments is adapted to form one point of contact with an inner component and two points of contact with an outer component, wherein the tolerance ring comprises a regular equilateral polygon,
wherein the tolerance ring comprises a stiffener disposed on a sidewall segment of the plurality of sidewall segments, wherein the stiffener comprises at least one side edge stiffener adjacent a respective side edge of the sidewall segment longitudinally extending along a line oriented parallel to the height of the sidewall segment, and a central stiffener disposed in a central portion of the sidewall segment longitudinally extending in a direction perpendicular to the height of the sidewall segment.

2. The tolerance ring according to claim 1, wherein the stiffener is monolithic with the sidewall segment.

3. The tolerance ring according to claim 1, wherein all sidewall segments of the plurality of sidewall segments each include at least one stiffener.

4. The tolerance ring according to claim 1, wherein the tolerance ring further comprises a low friction material affixed to at least a portion of at least one sidewall segment.

5. The tolerance ring according to claim 1, wherein the sidewall segment defines a length, $L_{ss}$, wherein the stiffener defines a length, $L_s$, and wherein $L_s$ is less than $L_{ss}$.

6. The tolerance ring according to claim 1, wherein a stiffener extends along at least two sidewall segments of the plurality of sidewall segments.

7. The tolerance ring according to claim 1, wherein the stiffener is engaged with the sidewall segment by a fastening element, an adhesive, mechanical deformation, or a combination thereof.

8. The tolerance ring according to claim 1, wherein at least a portion of the stiffener has an arcuate contour.

9. The tolerance ring according to claim 1, wherein at least a portion of the stiffener has a polygonal contour.

10. The tolerance ring according to claim 1, wherein the tolerance ring comprises a metal.

11. A tolerance ring comprising:
a body including a plurality of planar sidewall segments, each sidewall segment having a thickness and a height wherein each pair of sidewall segments meet at an angle A, wherein each angle is no less than 60°; and
a stiffener disposed on a sidewall segment of the plurality of sidewall segments of the body, wherein the stiffener comprises a projection extending from the sidewall segment, wherein each sidewall segment is generally planar in an unassembled state, and wherein at least one sidewall segment of the plurality of sidewall segments is adapted to form one point of contact with an inner component and two points of contact with an outer component, wherein the tolerance ring comprises a regular equilateral polygon, wherein the stiffener is disposed on a sidewall segment of the plurality of sidewall segments, wherein the stiffener comprises at least one side edge stiffener adjacent a respective side edge of the sidewall segment longitudinally extending along a line oriented parallel to the sidewall segment, and a central stiffener disposed in a central portion of the sidewall segment longitudinally extending in a direction perpendicular to the height of the sidewall segment.

12. The tolerance ring according to claim 11, wherein an aspect ratio of the body, as measured by a ratio of the height of the sidewall segment to the thickness of the sidewall segment, is at least 20:1.

13. The tolerance ring according to claim 11, wherein the stiffener extends along a first sidewall segment of the plurality of sidewall segments and terminates prior to contacting a second sidewall segment of the plurality of sidewall segments.

14. The tolerance ring according to claim 11, wherein the tolerance ring further comprises a low friction material affixed to at least a portion of at least one sidewall segment.

15. An assembly comprising:
an outer component defining a bore;
an inner component disposed within the bore of the outer component; and
a tolerance ring disposed between the inner and outer components, the tolerance ring comprising:
a body including a plurality of planar sidewall segments, each sidewall segment having a thickness and a height wherein each pair of sidewall segments meet at angle A, wherein each angle is no less than 60°, sidewall segment is generally planar in an unassembled state, and wherein at least one sidewall segment of the plurality of sidewall segments is adapted to form one point of contact with an inner component and two points of contact with an outer component, wherein the tolerance ring comprises a regular equilateral polygon,
wherein the tolerance ring comprises a stiffener disposed on a sidewall segment of the plurality of sidewall segments, wherein the stiffener comprises at least one side edge stiffener adjacent a respective side edge of the sidewall segment longitudinally extending along a line oriented parallel to the height of the sidewall segment, and a central stiffener disposed in a central portion of the sidewall segment longitudinally extending in a direction perpendicular to the height of the sidewall segment.

16. The assembly according to claim 15, wherein an aspect ratio of the body is at least 2:1.

17. The assembly according to claim 15, wherein the tolerance ring further comprises a low friction material affixed to at least a portion of at least one sidewall segment.

18. The assembly according to claim 15, wherein the stiffener extends radially outward from the tolerance ring.

19. The assembly according to claim 15, wherein the stiffener extends radially inward from the tolerance ring.

20. The assembly according to claim 15, wherein the tolerance ring comprises a circumferential gap disposed between circumferential ends of the tolerance ring.

* * * * *

UNITED STATES PATENT AND TRADEMARK OFFICE
CERTIFICATE OF CORRECTION

PATENT NO.         : 10,087,995 B2
APPLICATION NO.    : 14/732106
DATED              : October 2, 2018
INVENTOR(S)        : Andrew Robert Slayne Page 1 of 1

It is certified that error appears in the above-identified patent and that said Letters Patent is hereby corrected as shown below:

In the Claims

Column 18, Claim 11, Line 49, please insert --height of the-- after "parallel to the" and before "sidewall segment".

Column 19, Claim 15, Line 11, please insert --wherein each sidewall segment contacts the inner component, wherein each-- at the beginning of the line and before "sidewall segment".

Signed and Sealed this
Fifth Day of March, 2019

Andrei Iancu
*Director of the United States Patent and Trademark Office*